(12) United States Patent
Holembowski et al.

(10) Patent No.: US 9,152,454 B2
(45) Date of Patent: Oct. 6, 2015

(54) METHOD FOR ENABLING SEQUENTIAL, NON-BLOCKING PROCESSING OF STATEMENTS IN CONCURRENT TASKS IN A CONTROL DEVICE

(75) Inventors: Edgar Holembowski, Würzburg (DE); Hélène Schloter, Hoesbach (DE); Florian Zang, Würzburg (DE)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 13/511,979

(22) PCT Filed: Sep. 8, 2010

(86) PCT No.: PCT/EP2010/005527
§ 371 (c)(1),
(2), (4) Date: Oct. 2, 2012

(87) PCT Pub. No.: WO2011/063869
PCT Pub. Date: Jun. 3, 2011

(65) Prior Publication Data
US 2013/0081054 A1    Mar. 28, 2013

(30) Foreign Application Priority Data

Nov. 25, 2009  (DE) .......................... 10 2009 055 752

(51) Int. Cl.
*G06F 9/46*  (2006.01)
*G06F 9/48*  (2006.01)
*G05B 19/05*  (2006.01)

(52) U.S. Cl.
CPC .............. *G06F 9/4812* (2013.01); *G05B 19/05* (2013.01); *G06F 9/4881* (2013.01); *G05B 2219/1162* (2013.01); *G05B 2219/13068* (2013.01); *G05B 2219/13117* (2013.01); *G05B 2219/15079* (2013.01)

(58) Field of Classification Search
CPC ..................................................... G06F 9/4881
USPC ........................................................ 718/107
See application file for complete search history.

(56) References Cited

U.S. PATENT DOCUMENTS

| | | | |
|---|---|---|---|
| 4,302,820 A | 11/1981 | Struger et al. | |
| 6,009,454 A | 12/1999 | Dummermuth | |
| 7,234,139 B1* | 6/2007 | Feinberg | 718/1 |
| 7,334,229 B1* | 2/2008 | McDonald et al. | 718/104 |
| 2002/0147758 A1* | 10/2002 | Lee | 709/102 |

(Continued)

OTHER PUBLICATIONS

Marcello Bonfe et al., PLC-based control of a robot manipulator with closed kinematic chain, May 12-17, 2009, 2009 IEEE International Conference on Robotics and Automation.*

(Continued)

*Primary Examiner* — Emerson Puente
*Assistant Examiner* — Charlie Sun
(74) *Attorney, Agent, or Firm* — Maginot, Moore & Beck LLP

(57) ABSTRACT

A method for enabling sequential, non-blocking processing of statements in concurrent tasks in a control device having an operating system capable of multi-tasking, in particular a programmable logic controller, is disclosed. At least one operating system call, which causes the operating system to interrupt the particular task according to an instruction output by the statement in favor of another task, is associated with at least one statement.

4 Claims, 3 Drawing Sheets

(56) References Cited

U.S. PATENT DOCUMENTS

| | | |
|---|---|---|
| 2003/0037228 A1* | 2/2003 | Kelsey et al. .................. 712/245 |
| 2004/0109197 A1* | 6/2004 | Gardaz et al. ................ 358/1.15 |
| 2006/0212874 A1 | 9/2006 | Johnson et al. |
| 2010/0050184 A1* | 2/2010 | Lin et al. ....................... 718/107 |
| 2010/0175069 A1* | 7/2010 | Hoshika ........................ 718/104 |

OTHER PUBLICATIONS

International Search Report corresponding to PCT Application No. PCT/EP2010/005527, mailed Nov. 22, 2010 (German and English language document) (7 pages).

Bauer, Nanette et al., "Verification of PLC Programs Given as Sequential Function Charts", Integration of Software Specification Techniques for Application Engineering, vol. 3147, 2004, pp. 517-540.

Anderson, Eric, "Sequential Function Chart to PLC Ladder Logic Translation", DMC, Sep. 8, 2009.

Institute for Computing and Information Sciences, Radboud University, "Task and Scheduling", http://www.cs.ru.nl/lab/vxworks/vxworksOS.html, available prior to Oct. 2, 2012.

Murphy, Niall, "Watchdog Timers", Embedded Systems Programming, Nov. 1, 2000.

IEEE and the Open Group, sched_yield function definition, Available: http://pubs.opengroup.org/onlinepubs/009695399/, 2001.

Seungkweon, Jeong et al., "Scheduling Algorithm for Programmable Logic Controllers with Remote I/Os", Real-Time Computing Systems and Applications, 1997.

"IEC 61131-3: a standard programming resource", PLCopen, 2003.

* cited by examiner

METHOD FOR ENABLING SEQUENTIAL, NON-BLOCKING PROCESSING OF STATEMENTS IN CONCURRENT TASKS IN A CONTROL DEVICE

This application is a 35 U.S.C. §371 National Stage Application of PCT/EP2010/005527, filed on Sep. 8, 2010, which claims the benefit of priority to Application Serial No. DE 10 2009 055 752.0, filed on Nov. 25, 2009 in Germany, the disclosures of which are incorporated herein by reference in their entirety.

BACKGROUND

The present disclosure relates to a method for enabling sequential, non-blocking processing of statements in concurrent tasks in a control device having an operating system capable of multitasking, in particular a programmable logic controller (PLC), and to a control device and a computer program.

Different variants of programmable logic controllers are known. These are devices which are used to control or regulate a machine or system and are digitally programmed. Programmable logic controllers have superseded the hard-wired (hard-wired programmed) controllers used in the past and, like the latter, primarily operate in a state-oriented manner.

The European standard EN 61131, which corresponds to the international standard IEC 61131, deals with principles of programmable logic controllers and comprises, in part 3 (IEC/EN 61131-3) definitions of programming languages used in programmable logic controllers.

EN/IEC 61131-3 defines the following programming languages or rules: "instruction list" (IL), "ladder diagram" (LD), "function block diagram" (FBD), "sequential function chart" (SFC) and "structured text" (ST). The programming language ST, in particular, is based on known high-level programming languages and is also referred to as the structured control language. The languages IL and ST are text-based languages and the remaining languages (LD, FBD, SFC) are graphical forms. In all of the languages mentioned, it is possible to use functions and function blocks which were previously defined in another language and/or are provided by the manufacturer of a corresponding programmable logic controller in the form of software libraries (in binary form even without source code).

In the case of programmable logic controllers, the control program which is defined by the user is stored in a special electronically readable memory. Programs are processed in a programmable logic controller by the central processing unit (CPU), statements generally being processed in a cyclical manner. In this case, the programmable logic controller first of all assumes the signal states of the inputs, as a result of which the process image of the inputs is renewed. In a next step, an application program is processed statement by statement. During a necessary interrogation of the signal states of the inputs, the previously generated process image is accessed. After the statements have been processed step by step, the process image of the outputs is transmitted in the form of the current state and the cycle is thus ended. The described sequence (input image, processing, output image) is typically carried out within one task. The programmable logic controller then begins to execute the task with the next priority. Said cyclical program processing can be carried out in the form of synchronous (fixed, that is to say isochronous) or asynchronous cycles.

Programmable logic controllers may also operate in an event-controlled manner, in a status-controlled manner or in a freely running manner.

In the case of free-running tasks within a programmable logic controller, processing is effected in a "round robin" method at a low-priority level. The processing sequence corresponds to the abovementioned cyclical processing but no cycle time is defined. Therefore, very long processing times in comparison with cyclical tasks may occur, as a result of which the problem may arise of the input images "ageing" and of the output images not being renewed in good time. Therefore, as stated in more detail below, the previously explained renewal of the input process image and the transmission of the output process image, in particular, must be carried out independently thereof (for example in a concurrent task).

During the cyclical processing of statements in programmable logic controllers, in particular, the problem arises of the operating time of a processor of the programmable logic controller often not being used in an optimal manner because a distinction is not made between process data processing (cyclical tasks with a higher priority) and sequence control (sequential, low-priority, free-running tasks) in the use of tasks. Rather, sequence control is achieved by using sequencer management or SFC within the cyclical tasks. Therefore, the prioritization (cycle time) of the tasks must be designed in such a manner that all tasks can always comply with their maximum computation time (watchdog time). This "worst case" consideration results in ineffective use of the computation time since a shorter computation time is required in the normal state and the then unused computation time is virtually lost. In addition, a considerable amount of additional complexity arises when programming the sequencer or in the sequential function chart in comparison with sequentially operating commands since the latter implicitly implement the step enabling conditions.

In order to allocate computation time to tasks, so-called multitasking functions are available in computer systems. Multitasking or multi-process operation denotes the concurrent execution of a plurality of tasks by an operating system. For this purpose, different processes are activated in a cyclically repeating or freely running manner in a predefined order or priority, thus giving the impression of simultaneous processing.

It is desirable to specify processing of statements in concurrent tasks in a control device, in particular in a programmable logic controller, during which non-blocking execution of free-running tasks, in particular, is enabled in the form of multitasking using known programming languages, in particular structured text.

SUMMARY

The disclosure proposes a method for enabling sequential, non-blocking processing of statements in concurrent tasks in a control device having an operating system capable of multitasking, in particular a programmable logic controller, as well as a control device and a computer program having the features set forth below. Preferred refinements are specified below as well.

The present disclosure makes it possible to carry out, for example, sequential programming substantially within the specifications of the EN/IEC 61131-3 standard by means of the "structured text" programming language and using a cooperative multitasking model. This programming can be used to process so-called free-running tasks. In particular, the processing of sequence control statements can be improved.

As a result of the disclosure, sequence control can be programmed in a considerably more compact manner. The amount of program code to be generated by the programmer is considerably reduced. The processor time is distributed to the individual tasks in an improved manner.

Conventional sequential processing of statements in free-running tasks in a PLC is carried out in a blocking manner. During sequential processing which corresponds to a machine sequence, the process waits, at those points or program steps at which actions (for example movement commands) are initiated, until the execution of the action is acknowledged. At these points, blockades both of the respective task and of all other concurrent tasks occur. This blockade of the other concurrent tasks can be avoided by the solution according to the disclosure.

The basis for implementing the present disclosure can be, for example, a programmable logic controller of a conventional design having an operating system which is capable of multitasking, that is to say has operating system calls which cause the operating system to interrupt the respective task currently being processed in favor of another task if the task or a superordinate unit (watchdog) signals this. Such changeover of tasks (task switching) can be carried out, for example, when a waiting state arises in a task (waiting for an event) and an operating system function wait( ) is therefore called, for example.

Within the scope of the present disclosure, the intention is to use, for example, free-running tasks which are suitable for making optimum use of the remaining computation time of a programmable logic controller or a processor in such a controller.

In this case, the changeover logic, as presented by way of example within the scope of this application, advantageously corresponds to the "cooperative multitasking" known per se. Cooperative multitasking denotes a multitasking operation in which each process "voluntarily" returns control to the operating system core if this process no longer requires any computation time. It is thus left to each process itself when it returns control to the core.

Cooperative multitasking can be implemented in a simple manner if the respective processes reliably return control to the core. However, as soon as an individual process or a task terminates its cooperation (for example on account of a malfunction), that is to say does not return control to the operating system, this may result in a standstill of all free-running tasks involved. Therefore, one preferred refinement proposes providing a watchdog function in order to enable compulsory interruption of one task in favor of another.

Within the scope of the present disclosure, it is advantageously always possible to change over between tasks at positions or program steps at which a respective process or task is waiting for an event, that is to say the execution of a task and/or a command, for example. This measure advantageously results in optimum allocation of the processor time. In order to implement the measures according to the disclosure, standard commands (standard motion commands) are advantageously encapsulated in a respective new function, one or more operating system calls being provided in an associated manner within the encapsulated function. The library function (operating system function) for releasing the processor time is then called at the waiting points.

Such a function for releasing the processor time, for instance waitTime( ), is also available to control structures such as WHILE loops, for example, in order to make it possible for the user or programmer to release the processor time, in particular when programming an endless loop without abort conditions.

A control device, in particular a programmable logic controller, which is likewise provided according to the disclosure has all means for carrying out a method according to the disclosure as explained above.

The computer program provided according to the disclosure comprises program code means, in particular at least one structure encapsulating statements and operating system calls, which are provided using a method according to the disclosure. Suitable data storage media for such a computer program are, in particular, floppy disks, hard disks, flash memories, EEPROM, CD-ROM, DVDs etc. It is also possible to download such a program via a computer network (Internet, intranet, system network, etc.).

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

The disclosure is schematically illustrated in the drawing using exemplary embodiments and is described in detail below with reference to the drawing.

DETAILED DESCRIPTION

Figure 1:
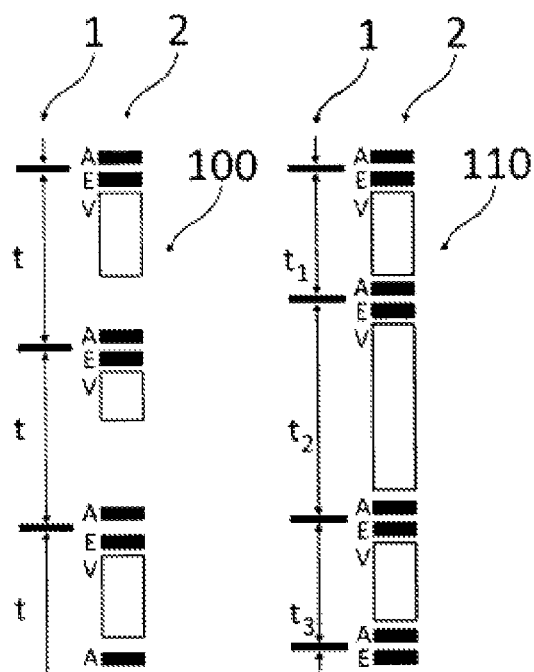
FIG. 1 shows a schematic illustration of periodic and cyclical processing of statements in a programmable logic controller according to the prior art.
Figure 2:
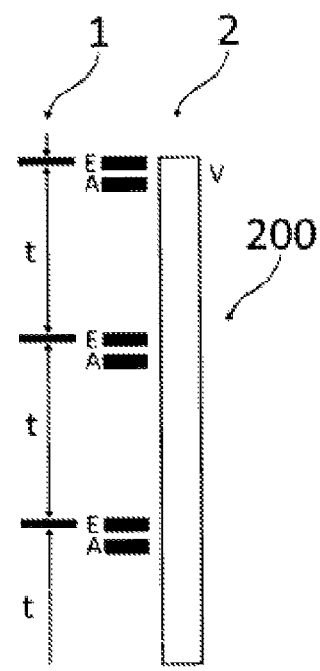
FIG. 2 shows a schematic illustration of processing of a free-running task in a motion controller according to the prior art.

FIG. 1 illustrates the conventional processing of statements in programmable logic controllers which is known from the prior art. In this case, scheme 100 depicts periodic processing of statements or commands and scheme 110 depicts cyclical processing of statements or commands, a cycle time t being indicated as synchronous in the case of periodic processing 100. In contrast, in the case of cyclical processing 110, the cycle time $t_1$, $t_2$, $t_3$ varies according to the duration of the respective processing of a command V. As generally known and explained above, a programmable logic controller reads an input image E at the start of each cycle and writes an output image at the end of a cycle (denoted A). A user program is processed or commands V are executed between the reading of the input image and the writing of the output image.

From the point of view of a traditional programmer of a programmable logic controller, the program is organized using a sequencer. This brings the individual commands into a particular execution order since they would otherwise overlap. As a result, a sequential, non-blocking command sequence is effected, the input and output images being cyclically updated.

In accordance with the illustration in FIG. 1, figure illustrates processing of statements 200, as is conventionally implemented in a motion control device (motion controller).

Processing is effected in the form of a free-running task V which is processed independently of the cycle and is initiated again after processing.

During processing V, the input and output images are updated continuously in the form of a periodic, concurrent task or in the form of interval control via a concurrent task. The command sequence in a motion control device is generally sequentially blocking. It should be understood that the measures according to the disclosure comprise, inter alia, transferring sequentially blocking processing of statements, as is known in principle from a motion controller, to a programmable logic controller. Such sequentially blocking processing of commands is not possible in programmable logic controllers on account of the restricted possibilities of conventional programming languages present there.

As described below, the present disclosure provides in this context, in a particularly advantageous manner, a capsule structure which encapsulates a command to be executed and, in addition to the command to be executed, has one or more operating system calls which, on the one hand, are used to read an output image and to write an input image and, on the other hand, can change over between concurrent tasks.

Figure 3:
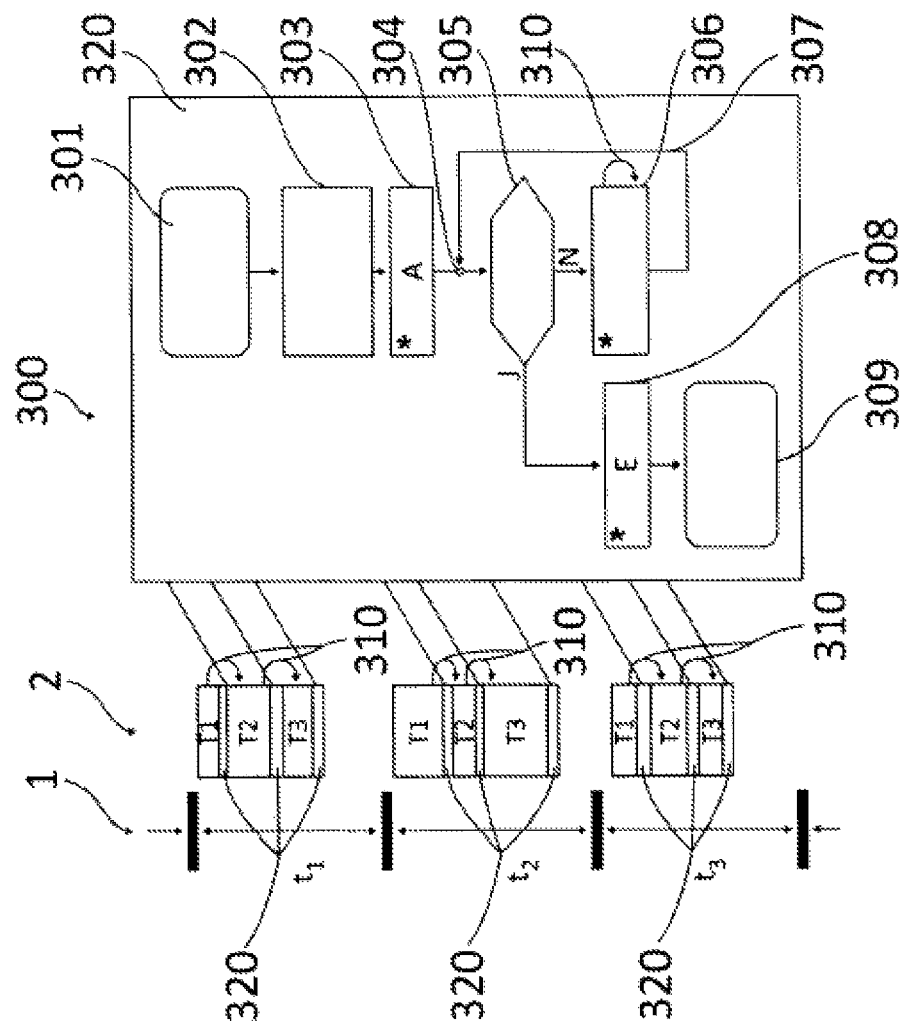
FIG. 3 shows a schematic illustration of sequential, non-blocking processing of statements in concurrent tasks in a control device according to one particularly preferred embodiment of the disclosure.

FIG. 3 shows processing of concurrent tasks, which is carried out in a sequentially blocking manner according to one particularly preferred embodiment. 1 is used to indicate the cycle sequence in a programmable logic controller, and 2 is used to indicate the actual processing of the respective tasks. T1 denotes a first task, T2 denotes a second task and T3 denotes a third task, the tasks T1, T2 and T3 being processed in a concurrent (parallel) manner and the impression of simultaneous processing arising on account of the multitasking capability of the operating system. 320 is used to denote respective program capsule functions which, as explained above, have operating system calls in addition to the actual command to be executed according to one particularly preferred embodiment of the disclosure.

A changeover between the respective tasks T1, T2 and T3 is carried out at times or transfer points 310 in each case. Control is transferred 310 from one task to another task by the operating system and on the basis of an operating system call, for example a function wait( ).

As mentioned, the measures according to the disclosure are advantageously implemented in the form of a capsule function 320 or a capsule structure 320 which is explained in more detail below. The capsule structure is an encapsulating command which has or comprises the actual command to be executed. The programmer uses this encapsulated command (for example "sMoveAbsolut( )") instead of the original command (for example "MoveAbsolut( )"). The programmer therefore does not need to include the operating system calls themselves in his program, which facilitates implementation even without knowledge of the internal program information.

The task T1 usually begins with the reading of an input image. The commands of the tasks T1 are then run through until an encapsulated command is encountered. The latter is represented by block 320. In step 301, the sequence of the conventionally blocking command begins. In step 302, a statement is output to a motion controller (for example to a motion handler). This is expediently effected in the form of a call for a motion function to an interpolator.

A first operating system call (denoted *), in this case the writing of an output image, is effected in step 303. After a command has thus been transferred to a motion handler in step 302, the system waits for the execution of the command. As illustrated in the context of FIG. 3, a capsule structure 320 comprises a test function consisting of an interrogation command 305 and a waiting step 306, an interrogation being carried out in step 305 in order to determine whether the transferred command has been executed in full. If this is the case, the processing of the commands, as described below, is continued. However, if this is not yet the case, the processing of the program continues with step 306 in which a further cycle t is awaited. An operating system call which causes an operating system to interrupt the respective task in favor of another task, that is to say to allocate the computation time to another task, is effected at the same time. This transfer is symbolized using arrow 310. The program returns to the interrogation 305 via sequence 307. The test thus comprises a cycle which runs as long as the command transferred in step 302 has not yet been processed.

After the computation time has been recovered and the command 302 has been processed, the program is continued with step 308 in which, likewise in the form of an operating system call, an input image is read and the encapsulated command reaches the end with step 309. The commands of the current task are then processed further until a further encapsulated command is reached, for example.

It should be understood that, in the event of a blockade in the processing in the block 320, for example in the event of unsuccessful transfer of a command in step 302, which results in the program being blocked and step 306 never being able to be reached, a loop interrogation with an operating system function corresponding to 310 can likewise be provided in such a manner that a jump is made to a next task as long as the command 302 has not yet been transferred. Alternatively, compulsory transfer 310 of control to another process can also be effected using a watchdog.

FIG. 3 thus illustrates a structure in which it is determined, in the form of an interrogation function, whether a command 302 which has been handed over has been executed in full.

Figure 4:
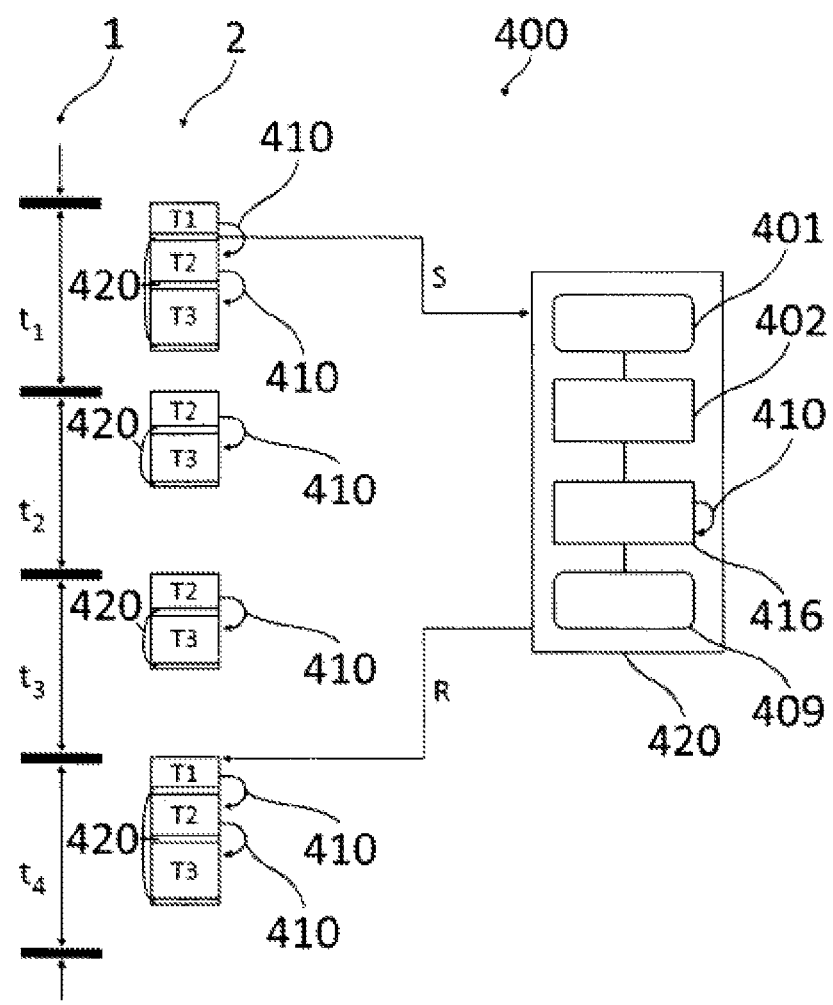
FIG. 4 shows a schematic illustration of sequential, non-blocking processing of statements in concurrent tasks in a control device according to another particularly preferred embodiment of the disclosure.

An alternative embodiment is illustrated in FIG. 4 and is denoted 400 overall. Instead of the test function in FIG. 3, a semaphore function 416 is used here. A capsule function 420 is also used here in a similar manner to that in FIG. 3. Within the capsule, the command begins with step 401. In a similar manner to step 302 in FIG. 3, a command is transferred to a motion handler in step 402. An operating system call which hands over control to another process is effected in step 410. However, a semaphore function 416 which suspends the task to be executed and thus changes it to a passive waiting function or a waiting situation is also initiated at the same time. The command remains in the suspended state, until the time at which the semaphore function is used to signal that the command initiated in step 402 has been processed, and is only reactivated R after the semaphore command. The command then reaches the end in step 409. In the left-hand part of FIG. 4, 2 is used to illustrate processing of tasks in a similar manner to FIG. 1. However, as a result of the task T1 being suspended S, this task is not executed in the cycles t2 and t3 but rather is only processed again in the cycle t4 following reactivation R.

The invention claimed is:

1. A method for enabling sequential, non-blocking processing of statements in concurrent tasks in a control device having an operating system capable of multitasking, comprising:

associating with a programmable logic controller (PLC) at least one statement corresponding to an operation that generates an output image for a cyclical update of an input image that is received as input to the PLC from a motion control device and writes the output image for operation of the motion control device to at least one output associated with the PLC with at least one operating system call;

executing with the PLC the at least one operating system call associated with the at least one statement to write the output image to the at least one output;

executing programmed instructions corresponding to the operating system with the programmable logic controller to interrupt execution of a first task immediately after execution of the operation associated with the at least one statement to write the output image to the at least one output; and executing programmed instructions with the programmable logic controller corresponding to a second task in response to interruption of execution of the first task.

2. The method as claimed in claim 1, further comprising:

reactivating with the PLC the first task after expiration of a predetermined processing time.

3. The method as claimed in claim 1, further comprising:

executing with the PLC the second task as a free-running task after processing of the first task.

4. The method as claimed in claim 1, further comprising:

generating with a watchdog timer associated with the PLC a timer interrupt signal;

interrupting with the PLC the execution of the first task in response to receiving the timer interrupt signal during execution of the first task; and interrupting with the PLC the execution of the second task in response to receiving the timer interrupt signal during execution of the second task.

\* \* \* \* \*